(12) United States Patent
Doyle et al.

(10) Patent No.: US 9,118,188 B2
(45) Date of Patent: Aug. 25, 2015

(54) WIRELESS CHARGING SYSTEM

(71) Applicant: Intel Corporation, Santa Clara, CA (US)

(72) Inventors: Brian S. Doyle, Portland, OR (US); Aleksandar Aleksov, Chandler, AZ (US); Ravindranath V. Mahajan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 13/716,376

(22) Filed: Dec. 17, 2012

(65) Prior Publication Data

US 2014/0167688 A1   Jun. 19, 2014

(51) Int. Cl.
*H02J 7/00* (2006.01)
*H02J 7/02* (2006.01)

(52) U.S. Cl.
CPC .............. *H02J 7/0004* (2013.01); *H02J 7/025* (2013.01); *H02J 7/0044* (2013.01); *Y02B 40/90* (2013.01); *Y02E 60/12* (2013.01)

(58) Field of Classification Search
CPC ......... Y02E 60/12; H02J 7/025; H02J 7/0044
USPC .................. 320/107–108, 114–115
See application file for complete search history.

(56) References Cited

U.S. PATENT DOCUMENTS

| | | | | |
|---|---|---|---|---|
| 8,400,162 B1* | 3/2013 | Jannson et al. | ............... | 324/427 |
| 8,680,815 B2* | 3/2014 | Wang et al. | ................... | 320/132 |
| 8,890,470 B2* | 11/2014 | Partovi | .......................... | 320/108 |
| 2001/0012563 A1* | 8/2001 | Sakai | ............................ | 428/412 |
| 2003/0111979 A1* | 6/2003 | Cheiky et al. | ................. | 320/137 |
| 2004/0251871 A1* | 12/2004 | Dvorak et al. | ................. | 320/108 |
| 2005/0127866 A1* | 6/2005 | Hamilton et al. | ............. | 320/108 |
| 2007/0182367 A1* | 8/2007 | Partovi | .......................... | 320/108 |
| 2007/0191075 A1 | 8/2007 | Greene et al. | | |
| 2009/0163820 A1* | 6/2009 | Eerden | .......................... | 600/481 |
| 2009/0218884 A1* | 9/2009 | Soar | ................................ | 307/11 |
| 2009/0273311 A1* | 11/2009 | Beers et al. | ................... | 320/108 |
| 2009/0278493 A1 | 11/2009 | Alden | | |
| 2010/0181964 A1* | 7/2010 | Huggins et al. | ............... | 320/108 |
| 2010/0201312 A1 | 8/2010 | Kirby et al. | | |
| 2011/0156661 A1* | 6/2011 | Mehta et al. | ................... | 320/160 |
| 2011/0215086 A1* | 9/2011 | Yeh | ............................... | 219/488 |

(Continued)

OTHER PUBLICATIONS

International Search Report and Written Opinion received for PCT Patent Application No. PCT/US2013/048684, mailed on Sep. 26, 2013, 12 pages.

*Primary Examiner* — Stacy Whitmore
(74) *Attorney, Agent, or Firm* — Kenneth A. Nelson (57) ABSTRACT

A wireless charging system includes a microelectronic package (110) containing a system on chip (120) (an SoC), an energy transfer unit (140), and a software protocol (127). The SoC includes a processing device (121), a memory device (122) coupled to the processing device, and a communications device (123) coupled to the processing device and the memory device. The communications device is capable of communicating wirelessly with an external electronic device (130). The energy transfer unit is capable of transferring energy to the external electronic device. The software protocol is implemented in the memory device and is capable of detecting a charging profile of the external electronic device and capable of adjusting a parameter of the energy transfer unit according to a requirement of the charging profile.

15 Claims, 4 Drawing Sheets

(56) References Cited

U.S. PATENT DOCUMENTS

| | | | |
|---|---|---|---|
| 2012/0187851 A1* | 7/2012 | Huggins et al. | 315/159 |
| 2012/0189146 A1* | 7/2012 | Wuidart | 381/312 |
| 2012/0235634 A1* | 9/2012 | Hall et al. | 320/108 |
| 2012/0274273 A1 | 11/2012 | Jacobs et al. | |
| 2012/0286723 A1* | 11/2012 | Ukita et al. | 320/107 |
| 2012/0306434 A1* | 12/2012 | Sassen et al. | 320/107 |
| 2013/0049672 A1* | 2/2013 | Taylor | 320/101 |
| 2013/0193912 A1* | 8/2013 | Bornhoft | 320/108 |
| 2014/0009109 A1* | 1/2014 | Lee et al. | 320/108 |
| 2014/0015470 A1* | 1/2014 | Lim et al. | 320/101 |
| 2014/0028251 A1* | 1/2014 | Jenwatanavet et al. | 320/108 |
| 2014/0070762 A1* | 3/2014 | Jenwatanavet et al. | 320/108 |
| 2014/0084860 A1* | 3/2014 | Jaax et al. | 320/108 |
| 2014/0143933 A1* | 5/2014 | Low et al. | 2/170 |
| 2014/0152235 A1* | 6/2014 | Huang et al. | 320/107 |
| 2014/0159651 A1* | 6/2014 | Von Novak et al. | 320/108 |
| 2014/0159652 A1* | 6/2014 | Hall et al. | 320/108 |
| 2014/0203770 A1* | 7/2014 | Salter et al. | 320/108 |
| 2014/0225560 A1* | 8/2014 | Walley et al. | 320/108 |
| 2014/0239899 A1* | 8/2014 | Tsai | 320/118 |
| 2014/0292269 A1* | 10/2014 | Keating et al. | 320/108 |

* cited by examiner

WIRELESS CHARGING SYSTEM

FIELD OF THE INVENTION

The disclosed embodiments of the invention relate generally to electrical energy transmission, and relate more particularly to wireless energy transfer.

BACKGROUND OF THE INVENTION

Mobile electronic devices, already in wide use throughout much of the world, are likely to see further increases in adoption rates as greater numbers of people put into service an increasing number of mobile phones, tablets, cameras, handheld gaming consoles, and similar equipment. Most such devices are powered by batteries or similar energy storage devices that need to be recharged at regular intervals. Existing wireless recharging systems offer potential advantages (such as greater convenience) compared to more conventional systems that require the mobile device to be plugged into an electrical outlet with a power cord, but face a variety of implementation issues that limit the realization of such advantages.

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a wireless charging system comprises a microelectronic package containing a system on chip (an SoC), an energy transfer unit, and a software protocol. The SoC comprises a processing device, a memory device coupled to the processing device, and a communications device coupled to the processing device and to the memory device. The communications device is capable of communicating wirelessly with an external electronic device. The energy transfer unit is capable of transferring energy to the external electronic device. The software protocol is implemented in the memory device and is capable of detecting a charging profile of the external electronic device and capable of adjusting a parameter of the energy transfer unit according to a requirement of the charging profile.

Mobile electronic devices have limited battery life and must therefore be frequently re-charged. If wired recharging is used then one must accept the various inconveniences that come with the use of a power cord: increased cable clutter, lack of flexibility with respect to charging location (must recharge at place where power cord is plugged in), a potential need to recharge at a time or place where a power cord is not accessible, and so forth. Wireless charging schemes overcome some of these issues but replace them with other potential drawbacks, including potential incompatibilities between wireless recharger and mobile device, aesthetics issues, and, as with wired systems, potential lack of charging-location flexibility. As will be described in detail below, embodiments of the invention address the foregoing and other issues by enabling expanded charging zones, embedded or decorative system components, smart communication protocols, and other potential advantages.

Figure 1:
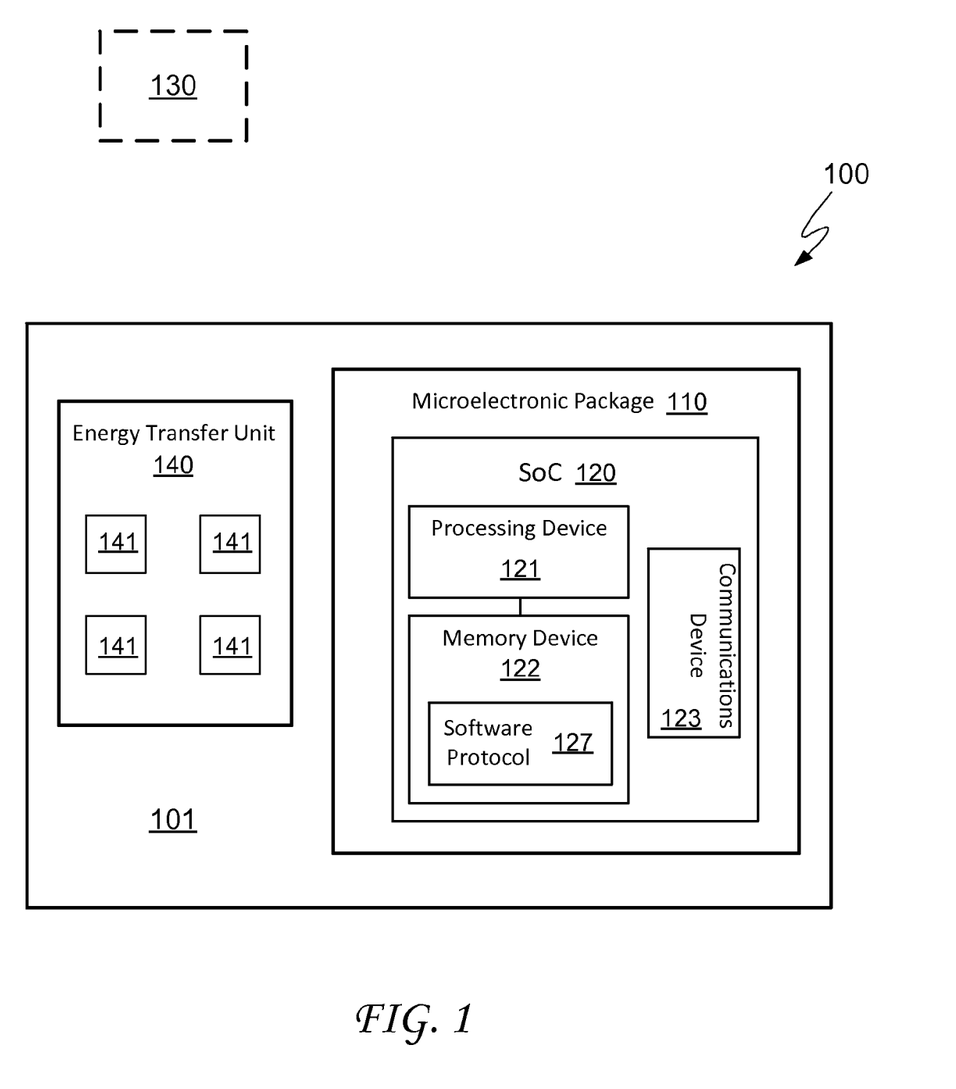
FIG. 1 is a schematic view of a wireless charging system according to an embodiment of the invention.

Referring now to the drawings, FIG. 1 is a schematic view of a wireless charging system 100 according to an embodiment of the invention. As illustrated in FIG. 1, wireless charging system 100 comprises a wireless charging unit 101 that includes a microelectronic package 110 containing an SoC 120. The SoC comprises to processing device 121, a memory device 122 coupled to the processing device, and a communications device 123 coupled to the processing device and the memory device.

Processing device 121 may comprise any type of integrated circuit (IC) device. In one embodiment, the processing device includes a processing system (either single core or multicore). For example, the processing device may comprise a microprocessor, a signal processor, to network processor, a chipset, etc. In one embodiment, the processing device itself comprises an SoC (separate from SoC 120) having multiple functional units (e.g., one or more processing units, one or more communications units, one or more signal processing units, one or more security units, etc.). However, it should be understood that the disclosed embodiments are not limited to any particular type or class of IC devices.

Memory device 122 may comprise any type of solid state memory device/array. In one embodiment the memory device includes only memory that retains information after power is removed from the system (i.e., non-volatile or permanent memory). For example, the memory device/array may be any type of Flash memory such as MLC, SLC, or the like; it may also be any type of phase change memory (PCM) or magnetic random access memory (MRAM). In another embodiment the memory is a combination of non-volatile solid state memory devices and a volatile memory device (solid state). For example this could be to combination of Flash, PCM, MRAM (non-volatile), and DRAM where the DRAM can be any type of DRAM that is supported by the memory controller of the SOC/processing device.

Communications device 123 may comprise any type of wireless radio device or any combination of radio devices supporting one or multiple communication protocols such as, but not limited to WiFi (IEEE802.11b/g/n or other future implementations), Bluetooth, 3G, LTE, WiMAX or other communication protocols that may be used for information transfer between devices.

A software protocol 127 is implemented in memory device 122. The software protocol is capable of detecting a charging profile of the external electronic device and capable of adjusting a parameter of the energy transfer unit according to a requirement of the charging profile. For example, the parameter of the energy transfer unit could be its power density, meaning that its time rate of energy transfer per unit volume may be altered by the software protocol according to the requirements of the external electronic device's charging profile. In fact, the power density will be determined by voltage and current swing as power (p)=voltage (v)*current (i), i.e., p(t)=v(t)*i(t), which suggests several parameters that may be adjusted in order to optimize charging, as further detailed below.

The charging profile of the external electronic device is the set of all parameters that affect the recharging of the battery (or other energy storage device) in the external electronic device, and, at least conceptually, includes at least the frequency, voltage swing, voltage amplitude, current swing, current amplitude, and shape (i.e., sinusoidal, saw tooth, square, etc.) of a wave form output by the energy transfer unit and received by the external electronic device. (Although the waveform will change somewhat as the energy passes through dispersive media, for all practical purposes the waveform output by the energy transfer unit may be assumed to be identical to the waveform received by the external electronic device.) Other requirements of the charging profile may include a percentage of maximum charging capacity and an optimal charging rate (i.e., the rate of energy transfer), among others. Often, but not necessarily always, the optimal charging rate will be the maximum possible charging rate.

The communications device is capable of communicating wirelessly with external devices, including an external electronic device 130 (shown in dashed lines as an indication that device 130 is separate from wireless charging system 100). As an example, external electronic device 130 can be a smart phone or other cellular telephone, a tablet, an electronic reading device, an MP3 player or other music player, or the like. Not shown, but also a part of SoC 120 or microelectronic package 110 are one or more antennae (both for power transmission (i.e., an inductor) and for communication), radios, voltage regulators, power switches, and circuitry for wireless power transmission (e.g., power amplifier modules and the like).

The communications protocol used by communications device 123 can be Bluetooth, WiFi, 3G, LTE, WiMAX, or any other communications protocol used by wireless devices. The ability to communicate with external devices means wireless charging system 100 can receive over-the-air updates to software, drivers, and so forth, thus extending system lifetime and increasing convenience and ease of use.

Wireless charging unit 101 further comprises an energy transfer unit 140 capable of transferring energy to the external electronic device. It should be noted that external electronic device 130 must be capable of being charged by the energy being emitted by energy transfer unit 140, in other words, external electronic device 130 needs its own counterpart to energy transfer unit 140, which counterpart may comprise at least a receiver and an antenna for power transmission (i.e., an inductor; perhaps built into a case of the external electronic device). The receiver may comprise additional voltage regulators/power regulators and an antenna for power reception. In some embodiments (but not all—see below), the wireless charging system further comprises a power cord (not shown) so that the wireless charging unit may be plugged into a power source such as a source of A/C power.

In one embodiment, energy transfer unit 140 comprises an inductive charging unit, which may operate according to principles of direct induction or resonant magnetic induction. In other embodiments, the energy transfer unit may operate using microwave radiation, laser energy, or other forms of electromagnetic radiation. Energy transfer unit 140 is capable of producing an energy transfer zone in which energy may be transferred from the energy transfer unit to external electronic device 130. In various embodiments, and depending, among other factors, on the nature of the material surrounding or in the vicinity of the energy transfer unit—or the material in which the unit may be embedded—the energy transfer zone may have a radius on the order of a centimeter or two, of at least 10 centimeters, or of 100 centimeters or more.

Energy transfer unit 140 may comprise multiple energy transfer sub-units 141, each one of which is capable of transferring energy to external electronic device 130, or to a different external electronic device (not shown), independent of (but simultaneously with) other energy transfer subunits within energy transfer unit 140. The software protocol is capable of detecting a charging profile of any of multiple external electronic devices and capable of adjusting a parameter of each of the energy transfer sub-units according to a requirement of any one of the charging profiles. In other words, a single energy transfer unit can charge the batteries of multiple devices and can do so in a way that is optimized for each device.

Figure 2A:
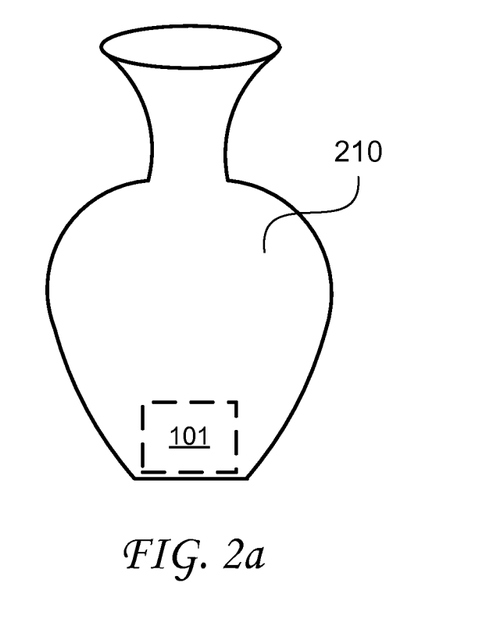
FIGS. 2a and 2b are side views of the wireless charging system enclosed within an exterior housing according to embodiments of the invention.
Figure 2B:
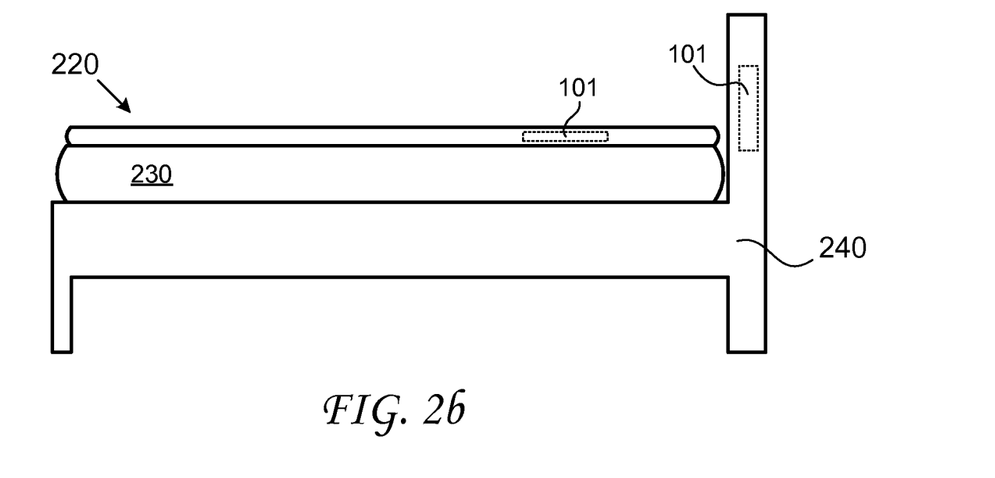

In some embodiments, wireless charging system 100 is a stand-alone unit that may be placed on a desktop, on a shelf, or in a similar location. In other embodiments, the wireless charging system further comprises an exterior housing that completely encloses the microelectronic package and the energy transfer unit. Examples of the latter embodiment style are shown in FIGS. 2a and 2b. In FIG. 2a, wireless charging unit 101 is embedded within, or placed inside of a vase 210 that acts as the exterior housing. In FIG. 2b, the exterior housing is a mattress pad 220 that sits on top of a conventional mattress 230, both of which rest atop a bed frame 240. Alternatively, wireless charging unit 101 may be embedded within bed frame 240. Another (non-illustrated) alternative is to embed the wireless charging system within mattress 230 and dispense with the mattress pad. If desired, wireless charging systems may be placed in more than one or in all of these or similar locations. Of course, there exist many other exterior housing possibilities beyond those depicted in FIGS. 2a and 2b. Some examples of these other housing possibilities are: door frames, ceilings, walls, and other structural components of houses and other buildings; any of a variety of decorative household objects similar to the vase shown in FIG. 2a; mouse pads, office chairs (e.g., in the armrest), desk drawers, and other office equipment or furniture; couches, chairs, night stands, coffee tables, and other furniture pieces; and doors, dashboards, etc. of vehicles.

Figure 3:
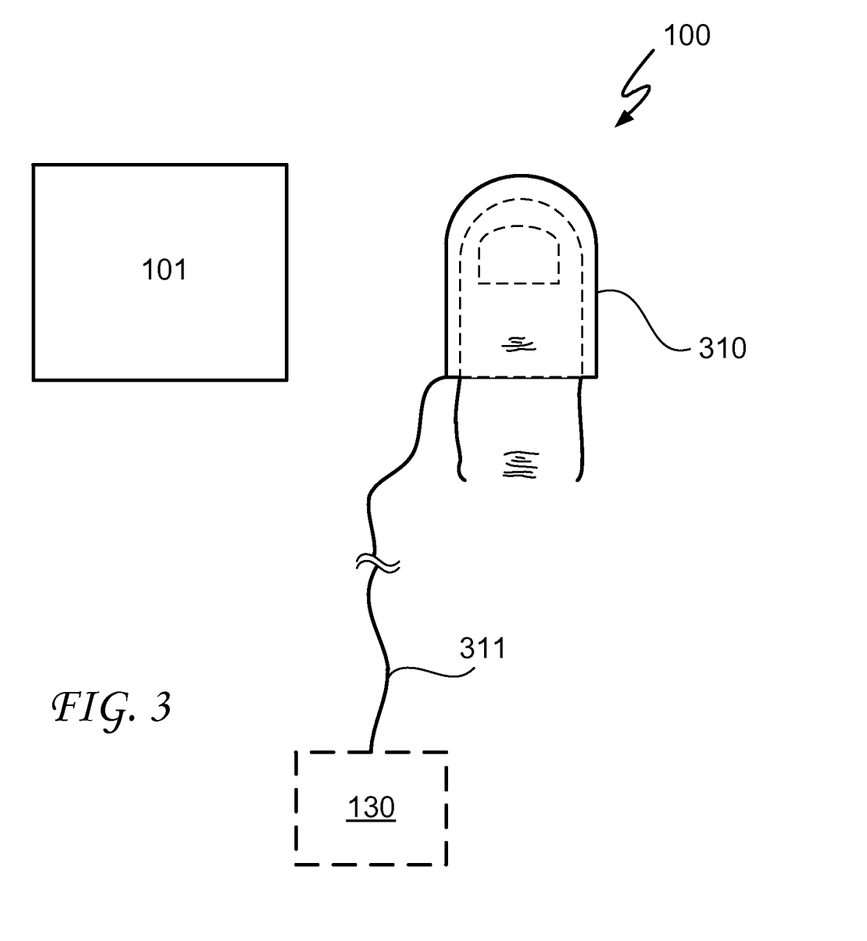
FIG. 3 is a schematic view of the wireless charging system of FIG. 1 according to another embodiment of the invention.

FIG. 3 is a schematic view of wireless charging system 100 according to another embodiment of the invention. As illustrated in FIG. 3, wireless charging system 100 further comprises an inductive charging unit 310 that includes a wire 311 capable of being electrically coupled to external electronic device 130. The system of FIG. 3 may be especially useful where wireless charging over a distance is not feasible, as further discussed below. It should be understood, however, that in other embodiments (including the embodiment of FIG. 1, described above), wireless charging system 100 does not include the additional components shown in FIG. 3 and may, in certain embodiments, consist solely of a wireless charging unit similar to (or the same as) wireless charging unit 101.

In the FIG. 3 embodiment, inductive charging unit 310 is capable of receiving energy wirelessly from energy transfer unit 140 (which, as mentioned above, may itself be an inductive charging unit). In various embodiments, inductive charging unit 310 is wearable, meaning that it is capable of being worn on a portion of a human body. In the illustrated embodiment, inductive charging unit 310 is a hollow rounded cap designed to be placed on the tip of a person's finger. The wide range of motion achievable by a person's hand and arm allows such a charging unit to be easily placed in contact or brought into close proximity with energy transfer unit 140 and thus receive energy therefrom. Examples will be given below. In other embodiments, such as where a finger cap would be inconvenient, inductive charging unit 310 could be designed to be worn elsewhere on the body, such as in the case of a ring, an arm band, a necklace, a head band, a bracelet, a wearable patch affixed to the body, or the like.

In the embodiment of FIG. 3, external electronic device 130 can be a smart phone, tablet, or similar device as described above in connection with FIG. 1 or it could be a game controller, an augmented reality device, a portable navigation device, etc. External electronic device 130 can also be an electronic device embedded inside one's body: a pacemaker, an insulin pump, etc., or it could be a wearable electronic item such as an electronic device woven into a shirt or a jacket, for example, or otherwise incorporated into an article of clothing, a purse, or the like.

Consider an example where external electronic device 130 is a pacemaker embedded within a person's body with no wires or other parts protruding. The pacemaker has its own (body-embedded) wireless receiver and an associated power pad that supplies power to the pacemaker located outside of the body in close proximity to the heart. The power pad would need to be regularly recharged. Rather than remove the pad in order to recharge it, which might be inconvenient or impossible, one could recharge the pad by transferring energy to it from the finger cap along wire 311, which energy could be easily obtained by touching the finger cap to (or bringing it close to) energy transfer unit 140. The finger cap thus acts as a wireless power receptacle from which power may be transferred by wires to different locations on a person's body or clothing. Obviously it is much easier to touch the power source (unit 140) with a fingertip than it would be with a point on the chest, and where such contact (or near contact) is necessary the FIG. 3 embodiment may well be quite useful.

As mentioned, inductive charging unit 310 is capable of receiving energy wirelessly from energy transfer unit 140. In practice, and with reference still to the embodiment of FIG. 3, inductive charging unit 310 may be placed in contact with wireless charging unit 101 and may wirelessly receive energy from the charging unit. Another context where such a system may be useful is where it is used to charge a charging station that is wearable (e.g., a battery incorporated into clothing) that can be used to charge devices that are old or out of date or for some other reason need wired charging. Consider a scenario in which one wants to be mobile but needs to charge an older cell phone that needs a power cable. At some convenient time (e.g., while sitting in a meeting, watching television, talking on the phone, etc.) one could rest a finger (equipped with the finger cap) on or near wireless charging unit 101 in order to charge a wearable battery or other wearable power storage unit (an electrochemical capacitor ("ultracapacitor," "supercapacitor," etc.) for example) that has a plug into which one can plug the device that needs wired charging. Yet another scenario where the FIG. 3 (or similar) embodiment may be valuable is one in which a regulatory agency limits the wireless transmission of energy provided by an embodiment of the invention to very small distances, in which case it may be necessary to use a finger cap or similar "close-range" configuration in order to transfer energy to certain external devices.

Figure 4:
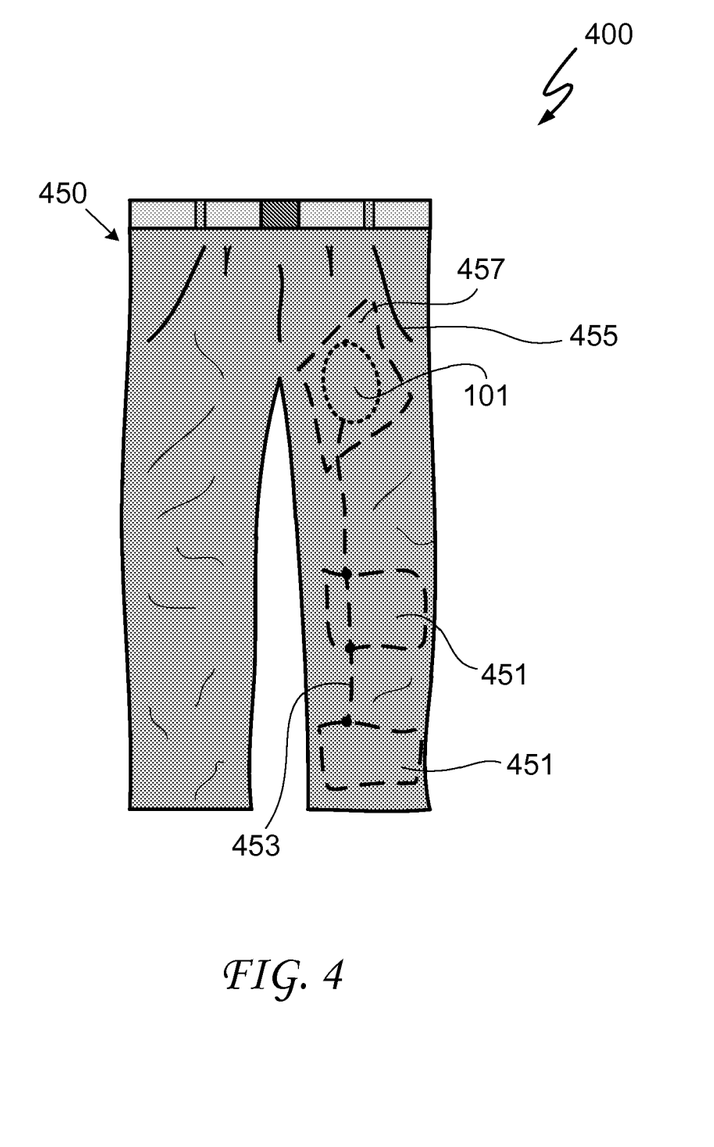
FIG. 4 is a front view of a wireless charging system according to another embodiment of the invention.

FIG. 4 is a front view of a wireless charging system 400 according to another embodiment of the invention. As illustrated in FIG. 4, wireless charging system 400 comprises wireless charging unit 101 and a wearable item 450 to which the wireless charging unit is charging unit is capable of being attached. In FIG. 4, wearable item 450 is depicted as being a pair of pants. Wireless charging unit 101 is attached to the pants in some fashion, perhaps by being placed in an interior or hidden pocket (not shown) or by being sewn into the lining. A configuration such as the one shown tends to reduce losses by placing the charging unit close to a likely location of external electronic devices, thus reducing the power required for efficient charging.

Besides pants, many other items also qualify as what is referred to herein as a "wearable item," including any other article of clothing; hats, gloves, and other outerwear; backpacks; jewelry; armbands; and so forth. The "wearable item" designation extends even to a patch or the like worn on a portion of the body or on clothing or any of the items mentioned previously: in short, anything at all that can be worn on the human body.

In the illustrated embodiment, wearable item 450 comprises an energy harvesting unit 451 capable of harvesting (e.g., capturing, storing, and redistributing) any type of energy generated by a human body, including vibrational energy, thermal energy, mechanical energy, and so forth. The energy thus harvested may be transferred to wireless charging unit 101 via a wire or other conductor 453 that is incorporated into the wearable item. Being thus provided with energy, wireless charging unit 101 may, as in embodiments previously described, transfer energy wirelessly to an external electronic device. As mentioned above, some such devices are likely to be at least temporarily stored or carried in a pocket 455 of wearable item 450 and may, at those times, thus be wirelessly charged efficiently and easily by receiving the energy that is wirelessly transmitted by wireless charging unit 101. Alternatively, energy from wireless charging unit 101 may be transferred to the external electronic device via a connecting wire in a manner similar to that described in connection with FIG. 3.

In certain embodiments, wearable item 450 comprises an electrically conductive shielding patch 457 positioned so as to be located between the wireless charging unit and the body of the person wearing item 450 and using wireless charging system 400. Such a shield may be used in situations where it is necessary or desirable to prevent transmitted energy from reaching the tissue of the person wearing wearable item 450.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the wireless charging system and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public wider the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A wireless charging system comprising:
   a microelectronic package containing an SoC, the SoC comprising:
   a processing device;
   a memory device coupled to the processing device; and
   a communications device coupled to the processing device and the memory device, the communications device configured to communicate wirelessly with an external electronic device;
   an energy transfer unit comprising multiple energy transfer sub-units, each one of which is configured to transfer energy to the external electronic device, or to a different external electronic device, simultaneously with but independent of other energy transfer sub-units within the energy transfer unit; and
   a software protocol implemented in the memory device, the software protocol configured to detect a charging profile of any of multiple external electronic devices and configured to simultaneously and independently adjust a parameter of each of the energy transfer sub-units according to a requirement of any one of the charging profiles.

2. The wireless charging system of claim 1 wherein:
   the energy transfer unit comprises a first inductive charging unit.

3. The wireless charging system of claim 2 further comprising:
   a second inductive charging unit that includes a wire electrically coupled to the external electronic device, the second inductive charging unit configured to wirelessly receive energy from the first inductive charging unit.

4. The wireless charging system of claim 3 wherein:
   the second inductive charging unit is configured to be worn on a portion of a human body.

5. The wireless charging system of claim 1 wherein:
   the energy transfer unit is configured to produce an energy transfer zone in which energy may be transferred from the energy transfer unit to the external device, the energy transfer zone having a radius of at least 1 centimeter.

6. The wireless charging system of claim 1 wherein:
   the energy transfer unit is configured to produce an energy transfer zone in which energy may be transferred from the energy transfer unit to the external device, the energy transfer zone having a radius of at least 10 centimeters.

7. The wireless charging system of claim 1 wherein:
   the energy transfer unit is configured to produce an energy transfer zone in which energy may be transferred from the energy transfer unit to the external device, the energy transfer zone having a radius of at least 100 centimeters.

8. The wireless charging system of claim 1 wherein:
   the parameter of the energy transfer unit is a power density.

9. The wireless charging system of claim 1 wherein:
   the requirement of the charging profile is a wave form output by the energy transfer unit and received by the external electronic device.

10. The wireless charging system of claim 1 wherein:
    the requirement of the charging profile is a percentage of maximum charging capacity.

11. The wireless charging system of claim 1 wherein:
    the requirement of the charging profile is an optimal charging rate.

12. The wireless charging system of claim 1 further comprising:
    an exterior housing that completely encloses the microelectronic package and the energy transfer unit.

13. A wireless charging system comprising:
    a wireless charging unit comprising:
    a microelectronic package containing an SoC, the SoC comprising:
    a processing device;
    a memory device coupled to the processing device; and
    a communications device coupled to the processing device and the memory device, the communications device configured to communicate wirelessly with an external electronic device;
    an energy transfer unit comprising multiple energy transfer sub-units, each one of which is configured to transfer energy to the external electronic device, or to a different external electronic device, simultaneously with but independent of other energy transfer sub-units within the energy transfer unit; and
    a software protocol implemented in the memory device, the software protocol configured to detect a charging profile of any of multiple external electronic devices and configured to simultaneously and independently adjust a parameter of each of the energy transfer sub-units according to a requirement of any one of the charging profiles; and a wearable item to which the wireless charging unit may be attached.

14. The wireless charging system of claim 13 wherein:

the wearable item comprises an energy harvesting unit.

15. The wireless charging system of claim 13 wherein:

the wearable item comprises an electrically conductive patch positioned so as to be located between the wireless charging unit and a body of a wearer.

* * * * *